United States Patent [19]

Rubin et al.

[11] Patent Number: 4,735,831
[45] Date of Patent: Apr. 5, 1988

[54] STRAND TREATMENT

[75] Inventors: Benjamin M. Rubin, Jackson; Wayne E. Shaw, Cordova; Ronald D. Osbirn, Jackson, all of Tenn.

[73] Assignee: Owens-Corning Fiberglas Corporation, Toledo, Ohio

[21] Appl. No.: 846,169

[22] Filed: Mar. 31, 1986

[51] Int. Cl.$^4$ .......................... B05D 7/24; B05D 1/26
[52] U.S. Cl. ................................... 427/445; 427/178
[58] Field of Search ............... 118/410, 420, DIG. 22; 427/175, 445, 178; 8/151.2

[56] References Cited

U.S. PATENT DOCUMENTS

| | | | |
|---|---|---|---|
| 4,020,196 | 4/1977 | Guillermin et al. | 427/175 X |
| 4,255,473 | 3/1981 | Williams, Jr. | 118/420 X |
| 4,605,573 | 8/1986 | Deeg et al. | 118/410 X |

Primary Examiner—Evan K. Lawrence
Attorney, Agent, or Firm—Patrick P. Pacella; Ronald E. Champion

[57] ABSTRACT

A method and applicator for applying a liquid material aftertreatment to a strand. Particularly, the strand is glass fibers or filaments and the aftertreatment is an antistat. The strand lightly touches the applicator at an orifice sufficiently small so that the strand retains essentially all of the liquid antistat. In a preferred embodiment, the orifice angles toward the direction of strand movement.

2 Claims, 1 Drawing Sheet

U.S. Patent
Apr. 5, 1988
4,735,831
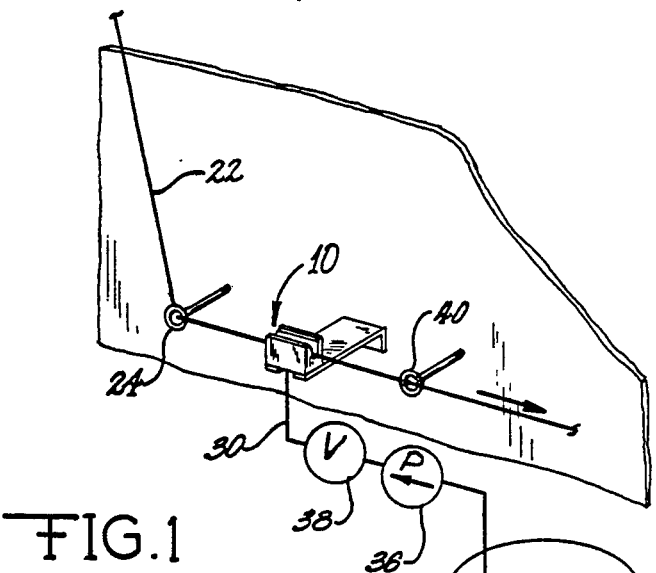
FIG.1
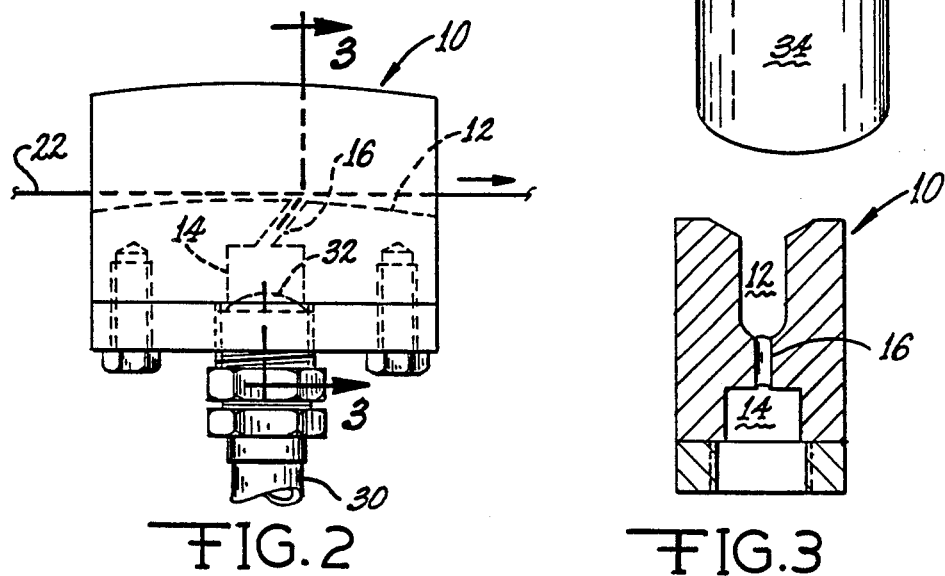
FIG.2
FIG.3

4,735,831

STRAND TREATMENT

TECHNICAL FIELD

This invention relates to a method for applying a liquid material as an aftertreatment to a strand. Typically, the strand is a bundle of glass fiber filaments. Further operations wind the coated strand into a package.

BACKGROUND ART

Conventional means for applying after coatings include a nozzle for spraying the liquid onto a large wheel which advances it to the strand. Excessive strand contact with the wheel causes fuzz which usually gathers at the nozzle. Spraying the liquid is inefficient and often causes a "wet" work area. Wet fuzz collects and hampers further operations.

SUMMARY OF THE INVENTION

We have developed a method for using a particular applicator which improves many of these problems. In our inventive method the strand barely touches the applicator thereby reducing much of the fuzz conventional applicators generate. We have developed an applicator with a very small orifice that allows for efficient after coating. Essentially all of the liquid we apply stays on the strand. More importantly, our method coats essentially all of the strand. Our post coating is not blotchy (hit and miss) as is typical with some conventional systems. We drill an orifice that is angled toward the direction of strand advancement. This allows for the uniform, efficient coating we achieve.

BRIEF DESCRIPTION OF THE DRAWINGS

FIG. 1 is a view of our applicator and related equipment.

FIG. 2 is a detailed side view of the applicator.

FIG. 3 is a sectional view taken along line 3—3.

BEST MODE OF CARRYING OUT THE INVENTION

One skilled in the art may use the method of this invention for applying liquid material as an aftertreatment onto a strand. Typically, fibers or filaments of heat-softened mineral material such as glass make up the strand. A winding machine pulls (attenuates) molten streams of glass from a melter and forms a package of strands. Our invention passes a strand over our applicator for an aftertreatment of liquid material. Our invention then winds the post-treated strand into a package. In one embodiment, the strand package is unwound, post-treated, and rewound and winds them into another package.

FIG. 1 shows applicator 10 and related equipment.

FIG. 2 shows a side view of applicator 10 of this invention. Guide means or passage 12 cuts across the top of applicator 10. Bore 14 cuts into applicator 10 from the bottom, and orifice 16 drills into applicator 10 connecting bore 14 and groove 12. In our preferred embodiment, orifice 16 angles toward the direction of strand advancement.

Referring back to FIG. 1, strand 22 passes or advanced through guide 24 towards applicator 10. Flexible tubing or pipe 30 connects with bore 14 to supply the post treatment liquid. Tube 30 and bore 14 may have threaded fittings 32 for easy connections. Supply container 34, pump 36 and valve 38 provide conventional flow control means to applicator 10. Strand 22 passes through groove 12 and receives aftertreatment liquid material from orifice 16. Post treated strand 22 passes through guide 40 and is wound into package (not shown) for shipping or further processing (e.g., chopping).

FIG. 3 is a front sectional view (cutaway) along line 3—3.

In a preferred embodiment, the applicator material is bronze. Typically, the block of bronze is in the neighborhood of 2 inches long, 1 inch high and 1 inch wide. In the preferred embodiment, the bore is perpendicular to strand movement and the orifice angles at 45° from vertical. We have also used an angle of 30°. While one skilled in the art may use a variety of angles, the key is that the orifice angle towards the direction of strand advancement.

While one can employ orifices with larger diameters needlessly, we have found diameters of less than 0.1 to be very satisfactory. In our preferred embodiment, the orifice had a diameter of 0.06 inch. Typically, passage 12 is wide enough to accommodate the strand. For the strand we're using, the passage had a width of 3/16 inch and a depth of about 5/16 inch. As FIG. 3 shows, the top of the passage may have beveled side walls.

INDUSTRIAL APPLICABILITY

A major advantage of our invention is that the orifice may be sufficiently small so that the strand retains essentially all of the liquid material passing by the orifice. The strand lightly deflects at the contact point, i.e., the strand barely "kisses" the applicator at the orifice. In the prior art applicators, strand contact with the applicator is much longer. Strand contact generates fuzz. Prolonged contact generates more fuzz. The fuzz attracts the liquids better than the strand. The cycle builds on itself with the liquids running down the fuzz rather than treating the strand.

The old system of spraying the post treatment on the strand as it contacted a wheel resulted in blotches of coating on the strand. The strand had bare spots with no coating. We verified this by including a red dye in the post treatment of a conventional system.

With the old system of spraying post treatment on the strand as it contacted a wheel, the liquid post treatment frequently dripped onto the floor below the applicator. We pumped a coating rate of 16 cc/min. With this invention, we have little or no dripping at the applicator. We were able to reduce the coating rate to 13 cc/min and achieve the same moisture content on the strand. The chemical waste has been reduced by 20%.

When we first used an applicator similar to the one of this invention, we drilled the orifice perpendicular to the direction of strand movement. Often glass came off the strand and plugged the orifice. The strand would defilamentize and plug the orifice.

When we drilled the orifice at an angle towards the direction of strand movement, we were able to eliminate plugging of the orifice. Any defilamentized glass would have to do a U-turn to get into the orifice.

While our applicator can meter a variety of coatings onto a strand or yarn, we've found it particularly useful for applying an antistat treatment to a strand. Typically, we employ a water soluble antistat solution. We have found aqueous solutions of materials such as polyvinylpyrrolidone or quaternary amines to give excellent antistat properties to a strand or yarn. These static controls provide processability through improved ribbon and static reduction.

Glass fibers we use to practice our invention can be "E" glass fibers, well known to those skilled in the art. U.S. Pat. No. 2,334,961 describes these fibers.

One skilled in the art produces strands of glass fibers by pulling several hundred or more tiny molten streams of glass which issue from holes in the bottom of a molten glass tank over a size applying apron to a gathering shoe which groups the fibers together into a strand. This strand then proceeds to a traverse mechanism and winding drum which provides the pulling action which attenuates the molten glass and coils the strand into a package. the process separates the fibers at the time that they pass over the size applicator so that the applicator substantially completely coats the surfaces of the fibers before the process draws them together into a strand. This size acts as a lubricant which separates the individual filaments. If the size doesn't separate the filaments, the fibers will scratch each other and break as they flex and draw over guide eyes in subsequent finishing operations.

We claim:

1. A method for applying a liquid material as an after-treatment to a strand including the steps of advancing a strand in one direction over an applicator means, and coating the strand with the liquid material through an orifice in the applicator means wherein the strand barely kisses the applicator means at the orifice, the orifice angling toward the direction of strand advancement.

2. A method according to claim 1 wherein the liquid material includes an antistatic agent.

* * * * *